(12) United States Patent
Reichel et al.

(10) Patent No.: US 11,511,652 B2
(45) Date of Patent: Nov. 29, 2022

(54) SEAT PART, IN PARTICULAR A BACKREST FOR A VEHICLE SEAT

(71) Applicant: ADIENT ENGINEERING AND IP GMBH, Burscheid (DE)

(72) Inventors: Uwe Reichel, Kaiserslautern (DE); Georg Ludwig Fischer, Winnweiler (DE)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 16/973,468

(22) PCT Filed: Jun. 13, 2019

(86) PCT No.: PCT/EP2019/065554
§ 371 (c)(1),
(2) Date: Dec. 9, 2020

(87) PCT Pub. No.: WO2019/238852
PCT Pub. Date: Dec. 19, 2019

(65) Prior Publication Data
US 2021/0245637 A1    Aug. 12, 2021

(30) Foreign Application Priority Data
Jun. 13, 2018   (DE) ................ 10 2018 209 427.6

(51) Int. Cl.
*B60N 2/68*   (2006.01)
*B60N 2/90*   (2018.01)
*B60N 2/64*   (2006.01)

(52) U.S. Cl.
CPC .............. *B60N 2/682* (2013.01); *B60N 2/64* (2013.01); *B60N 2/686* (2013.01); *B60N 2/986* (2018.02)

(58) Field of Classification Search
CPC .. B60N 2002/684; B60N 2/682; B60N 2/686; A47C 4/028; A47C 4/03
See application file for complete search history.

(56) References Cited

U.S. PATENT DOCUMENTS 2,625,205 A * 1/1953 Holmes ............... A47C 3/023
                                                    297/295
3,036,864 A * 5/1962 Zentaro ............... A47C 4/028
                                                    297/463.1
(Continued)

FOREIGN PATENT DOCUMENTS

CH          324616 A  * 10/1957  ............ A47C 4/02
DE        19727006 A1    1/1998
(Continued)

OTHER PUBLICATIONS

European Patent Office, International Search Report with Written Opinion, issued in PCT/EP2019/065554, dated Sep. 27, 2019, 12 pages, European Patent Office, Rijswijk, Netherlands.

*Primary Examiner* — Timothy J Brindley
(74) *Attorney, Agent, or Firm* — Marshall & Melhorn, LLC

(57) ABSTRACT

A seat part for a vehicle seat may have a support structure which has a tubular frame and a composite component. The tubular frame may have at least one opening on a front side. A threaded sleeve may be arranged and the composite component is arranged on the front side of the tubular frame and is secured to the tubular frame via a screw screwed into the threaded sleeve.

19 Claims, 7 Drawing Sheets

(56) References Cited

U.S. PATENT DOCUMENTS

| | | | |
|---|---|---|---|
| 3,471,199 A * | 10/1969 | Kuhlmann | A47C 7/16 297/411.41 |
| 5,988,755 A | 11/1999 | Fastelli et al. | |
| 6,070,940 A * | 6/2000 | Wu | A47C 3/00 297/411.28 |
| 7,077,478 B2 * | 7/2006 | Nakamura | B60N 2/68 297/440.15 |
| 7,765,767 B2 | 8/2010 | Scholte | |
| 9,272,643 B2 * | 3/2016 | Nagayasu | B60N 2/643 |
| 10,052,987 B2 * | 8/2018 | Schacht | B60N 2/914 |
| 2008/0136240 A1 * | 6/2008 | Matthews | B60N 2/986 297/354.1 |
| 2016/0200231 A1 * | 7/2016 | Ter Steeg | B32B 3/266 297/452.62 |
| 2016/0207434 A1 * | 7/2016 | Bolte | B60N 2/22 |
| 2018/0001809 A1 * | 1/2018 | Kaneda | B60N 2/686 |
| 2018/0105085 A1 * | 4/2018 | Duncan | B60N 2/58 |
| 2018/0281645 A1 * | 10/2018 | Tokumoto | B60N 2/686 |
| 2019/0061580 A1 * | 2/2019 | Zou | B60N 2/72 |
| 2019/0359102 A1 * | 11/2019 | Oshima | B60R 21/207 |

FOREIGN PATENT DOCUMENTS

| | | | |
|---|---|---|---|
| DE | 69811133 T2 | 10/2003 | |
| DE | 10328044 A1 | 2/2005 | |
| DE | 102009017375 A1 | 10/2010 | |
| DE | 1022015113507 A1 | 2/2017 | |
| EP | 1491395 A2 | 12/2004 | |
| FR | 2747305 A1 | 10/1997 | |
| FR | 2935315 A1 * | 3/2010 | B60N 2/686 |
| JP | S61-72252 U | 5/1986 | |
| JP | H10-153205 A | 6/1998 | |
| JP | 2009100998 A | 5/2009 | |
| JP | 2012030634 A | 2/2012 | |
| JP | 2018024423 A * | 2/2018 | B60N 2/68 |
| WO | WO92/06259 A1 | 4/1992 | |
| WO | WO-9622193 A1 * | 7/1996 | A47C 4/02 |

* cited by examiner

SEAT PART, IN PARTICULAR A BACKREST FOR A VEHICLE SEAT

The invention relates to a seat part, in particular a backrest for a vehicle seat.

Seat parts, such as backrests for vehicle seats, are generally known from the prior art.

It is an object of the present invention to specify a seat part for a vehicle seat that is improved in relation to the prior art and is designed to be sufficiently load-bearing with an improved contour.

The object is achieved according to the invention by a seat part for a vehicle seat having the features of claim 1.

Advantageous embodiments of the invention form the subject matter of the dependent claims.

A seat part according to the invention, in particular a backrest for a vehicle seat, also referred to as a seatback or seatback part, comprises a support structure, formed at least from a tubular frame and a composite component, wherein the tubular frame has, on a front side, at least one opening in which a threaded sleeve, also referred to as a threaded bush, is arranged, and wherein the composite component is arranged on the front side of the tubular frame and is fastened to the tubular frame by means of a screw screwed into the threaded sleeve.

The seat part can be in particular a backrest or a seat surface of the seat.

In one embodiment, the composite component and the tubular frame form a contoured element of the seat part. In particular, the contoured element forms a seat contour for a seat user. In other words: both the composite component and the frame are in each case shaped and joined together in such a way that they form a seat contour for a seat user. In the case of a backrest, the contoured element has for example a central back region and two side bolster regions which are inclined with respect to the back region. In the case of a seat surface, the contoured element has for example a central seat surface region and two side bolster regions which are inclined with respect to the seat surface region.

In the case of a backrest with integrated headrest, the contoured element has in particular a central back region, which is connected to a head region via a neck region, and two side bolster regions which are inclined with respect to the back region.

In a further embodiment, the composite component is of shell-shaped design and has for example, on the front side and rear side, depressions which are provided with a stiffening structure, in particular a ribbed and/or honeycomb structure. In the edge region of the shell, the composite component can have channel-shaped depressions which are provided with a stiffening structure, in particular a ribbed and/or honeycomb structure. In the central region of the shell, the composite component can have planar depressions which are provided with a ribbed structure. The stiffening structures are incorporated, in particular by an injection-molding method, into the depressions formed in on the front side and/or rear side in such a way that the stiffening structures terminate flush with the shell and thus form a surface plane or contour of the seat part.

Moreover, the composite component can have, in a lower shell region, a u-shaped cutout or a u-shaped channel in which the tubular frame is arranged in a correspondingly formed manner. The u-shaped channel is in particular formed integrally into the composite component in its lower shell region. Here, the tubular frame is inserted into the cutout or the channel in such a way that it terminates flush with the shell region, with the result that the tubular frame and the shell form a surface plane or contour of the seat part.

The front side of the seat part is in particular a bearing surface of the backrest or of the seat surface and thus faces an occupant when the latter is seated in the vehicle seat. The tubular frame advantageously has on the front side a plurality of such openings in each of which a threaded sleeve is arranged, with the result that the composite component arranged on the front side of the tubular frame is fastened to the tubular frame by means of screws screwed into the respective threaded sleeve. Instead of a screw, it is also possible to use another connection technique, for example a riveting technique.

A further aspect provides for a flexible adaptation element having an aperture, which is arranged in correspondence with the opening, for the screw or rivet to be provided between the tubular frame and the composite component, wherein the screw or rivet penetrates the adaptation element and, with the tubular frame and composite component in the assembled, in particular screwed or riveted, state, the adaptation element is braced between them, in particular braced in a defined manner.

For example, the adaptation element can be placed on the tubular frame in a form-fitting manner or can be arranged thereon in the direction of the composite component in the manner of a spacer element, wherein the composite component in turn can be arranged on the adaptation element and hence the adaptation element is arranged between the tubular frame and the composite component. Here, the adaptation element is braced between the tubular frame and the composite component in an adjustable manner by means of an arresting means, such as a screw or a rivet, which connects said tubular frame and composite component to one another.

By means of the flexible adaptation element, which is adjustably braced by means of the screw or rivet, between the tubular frame and composite component, it can be made possible for the body of a seat user or occupant of the vehicle seat to bear on the backrest with a substantially uniform spacing from the composite component. That is to say the body advantageously has at all points an equal spacing from the composite component or tubular frame, with it being the case that, in the finished vehicle seat, in particular an upholstery is arranged between the occupant and composite component or tubular frame. This setting of the composite component and tubular frame by means of the adaptation element(s) means that pressure points on the body of the occupant can be reduced or even avoided.

Both the tubular frame and the composite component are load-bearing, that is to say they take up loads acting on them by an occupant. A load-bearing overall structure is formed by the connection of the tubular frame and composite component, with the composite component being relieved of load in dynamic load cases by virtue of the tubular frame which has a high stiffness and strength.

The solution according to the invention makes possible a connection technique for the tubular frame and composite component, which form a support structure for a seat part, for example a backrest or a seat surface, wherein the connection technique is realized in such a way that, from a rear view of the load-bearing structure, that is to say of a rear side of the backrest, connecting elements, in particular the screw and the threaded sleeve or the plurality of screws and threaded sleeves, are not visible since the respective opening is arranged on the front side of the tubular frame, with the result that the opening and the threaded sleeve arranged therein are concealed by the tubular frame, which is closed on the rear side. The respective screw is also introduced into the opening in the tubular frame from the front through the composite component and screwed into the threaded sleeve, that is to say screwed from front to rear, with the result that the respective screw is also not visible from the rear since it is completely concealed in particular by the composite component and additionally by the tubular frame. This affords a good visual impression of the load-bearing connection technique connecting composite component to tubular frame.

The connection technique between tubular frame and composite component comprises a plurality of screw-sleeve connections, wherein the adaptation elements which are arranged between the tubular frame and the composite component can be different from one another. For example, the different adaptation elements can differ in terms of shape, size, material and/or dimensions. It is thus possible for example as a function of their position for different heights to be evened out. For example, depending on the degree of the loading of the respective backrest region, adaptation elements made of a stronger material can be used in regions with a higher loading and adaptation elements with more flexible material properties can be used in less loaded backrest regions.

In one possible embodiment, the respective adaptation element takes the form of a clamping element. For example, the adaptation element comprises a sleeve with a clamping collar, clamping arms, clamping wings and/or other suitable elastic elements. Alternatively, the adaptation element can take the form of a disk or a plate with elastic regions. The sleeve or disk or the plate is here arranged in a supporting manner between the tubular frame and the composite component, in particular in the region of an embossment, wherein the elastic elements, such as clamping collar, clamping arms and clamping wings, can additionally be secured on the tubular frame, in particular are supported in an adjustable manner.

In one possible embodiment, the threaded sleeve or, in the case of a plurality of threaded sleeves, the respective threaded sleeve is welded into the tubular frame. This is a simple-to-realize possibility of arranging the threaded sleeve or the plurality of threaded sleeves in the tubular frame and in particular requires no additional installation space. However, the realization of this embodiment is dependent on a possible load on the respective threaded sleeve and thus on the connection to the tubular frame, and is additionally dependent on a tube wall thickness of the tubular frame.

Particularly if this embodiment cannot be realized on account of the aforementioned criteria, in particular load and tube wall thickness, another possible embodiment can be used. In this possible embodiment, the threaded sleeve is a constituent part of an adaptation element, also referred to as an adaptation plate, which is fastened to the front side of the tubular frame. Here, the fastening of the adaptation element to the tubular frame is carried out in such a way that the threaded sleeve engages in the opening in the tubular frame or that, in the case of a plurality of threaded sleeves, the respective threaded sleeve engages in the respective opening provided for it in the tubular frame.

In order to facilitate the incorporation of the opening or of the plurality of openings in the tubular frame and/or to facilitate the fastening of the adaptation element and/or of the composite component to the tubular frame, the tubular frame has for example an embossment on its front side in the region of the opening or of the plurality of openings. That is to say the opening or the plurality of openings is/are arranged in the base surface of the embossment. In one possible embodiment, the adaptation element is arranged in the region of the embossment, in particular on the base surface of the embossment or in the region of the base surface, for example above the base surface, that is to say lifted therefrom and thus spaced apart from the front side of the tubular frame in the region of the embossment, with the result that only edge regions of the adaptation element bear against the tubular frame laterally of the embossment. For example, fastening of the adaptation element to the tubular frame is facilitated as a result.

For example, the adaptation element and/or the tubular frame are/is formed from metal. Particularly if both the adaptation element and the tubular frame are formed from metal, this allows the adaptation element to be connected to the tubular frame in a simple and stable manner. For example, the adaptation element is welded to the tubular frame.

The composite component is configured for example from an, in particular formed, organosheet. Such an organosheet is a fiber composite component, wherein the as yet unshaped organosheet is in particular a fiber matrix semi-finished product, comprising at least one fiber weave or laid fiber scrim which is embedded in a plastic, in particular a polymer material or thermoplastic, for example in a polymer matrix or thermoplastic matrix. This is effected for example by an injection-molding method. For example, the polymer matrix or the thermoplastic matrix is formed at least from polypropylene or polyamide which is applied to the organosheet by means of an injection-molding method. The fiber weave or laid fiber scrim is formed from a natural or synthetic material, with in particular carbon fibers or glass fibers being used. The organosheet is moreover hot-formable in that it is heated for example by infrared light radiation and then formed, for example by being inserted into a corresponding mold. Such a composite component has in particular a low weight and a high stability.

Moreover, an injection-molding compound, for example a plastic compound, in particular polypropylene or polyamide, can be molded onto the organosheet. For example, stiffening structures, in particular in the form of ribbed structures and/or honeycomb structures, and/or receptacles for add-on parts to be fastened to the vehicle seat are formed by the injection-molding compound. The stiffening structures made of plastic and the polymer matrix of the organosheet can be molded onto the fiber weave or laid fiber scrim in an injection-molding process.

The composite component is formed for example by heating the organosheet and inserting it into an injection mold, with the result that the organosheet is brought into a predetermined shape corresponding to the formation of at least one molded part of the injection mold. Furthermore, in this injection mold, the injection-molding compound, in particular a plastic, in particular a thermoplastic, is molded onto the organosheet to form stiffening structures.

A vehicle seat comprises such a seat part, in particular such a backrest or seat surface. As a result, the above-described advantages are also achieved for the vehicle seat.

A vehicle comprises at least one such vehicle seat, with the result that the above-described advantages are also achieved for the vehicle.

In a method for producing the seat part, such as for example the backrest, at least one opening or a plurality of such openings are/is introduced into the tubular frame at its front side, into which opening or into each of which openings a threaded sleeve is arranged, and the composite component is arranged on the front side of the tubular frame and fastened to the tubular frame by means of a screw screwed into the threaded sleeve or by means of a plurality of screws screwed into the respective threaded sleeve.

As already mentioned above, there is the possibility that the threaded sleeve is welded into the tubular frame or the plurality of threaded sleeves are welded into the tubular frame, with this in particular being dependent on loading and tube wall thickness of the tubular frame. Alternatively, the adaptation element with integrated threaded sleeve or a plurality of integrated threaded sleeves is used and is fastened to the front side of the tubular frame in such a way that the threaded sleeve engages in the opening of the tubular frame or the plurality of threaded sleeves in each case engage in an opening of the tubular frame.

In order to facilitate the introduction of the opening or of the plurality of openings and the mounting of the composite component and, if used, also of the adaptation element, the embossment is introduced on the front side of the tubular frame in the region of the opening or the plurality of openings or the provided opening or openings, that is to say for example first the opening or the plurality of openings and then the embossment can be produced or first the embossment and then the opening or the plurality of openings can be produced. Producing the embossment first and then the opening or the plurality of openings has the advantage that the respective opening can be produced more simply on the rectilinear base surface of the embossment and is not deformed by a subsequent embossing. The production of the embossment occurs prior to the arrangement of the composite component and the possible arrangement of the adaptation element.

The adaptation element is advantageously arranged in the region of the base surface of the embossment, in particular above the base surface. The adaptation element is for example welded to the tubular frame.

The composite component is for example configured from the, in particular formed, organosheet. The forming occurs in the above-described manner by heating and forming, for example in an injection mold in which in particular the injection-molding compound is molded onto the organosheet.

The composite component can be produced in particular in a so-called one shot hybrid molding process as organosheet with injection-molding compound in automated manufacture. Here, the forming of the heated organosheet and the molding on of the injection-molding compound advantageously occur in the injection mold.

The described solution particularly offers a connection technique for the connection of organosheet with injection-molded compound and an in particular metallic tubular frame having a good visual impression, in particular as a result of the concealed and thus nonvisible connecting elements.

BRIEF DESCRIPTION OF THE DRAWINGS

Exemplary embodiments of the invention will be explained in more detail on the basis of drawings, in which.

Parts which correspond to one another are provided with the same reference signs in all the figures.

On the basis of FIGS. 1A to 3, a description will be given below, as seat part S, of a backrest 1 for a vehicle seat 2 and the production thereof. Instead of a backrest 1, the invention can also be applied to a seat surface.

Figure 1A:
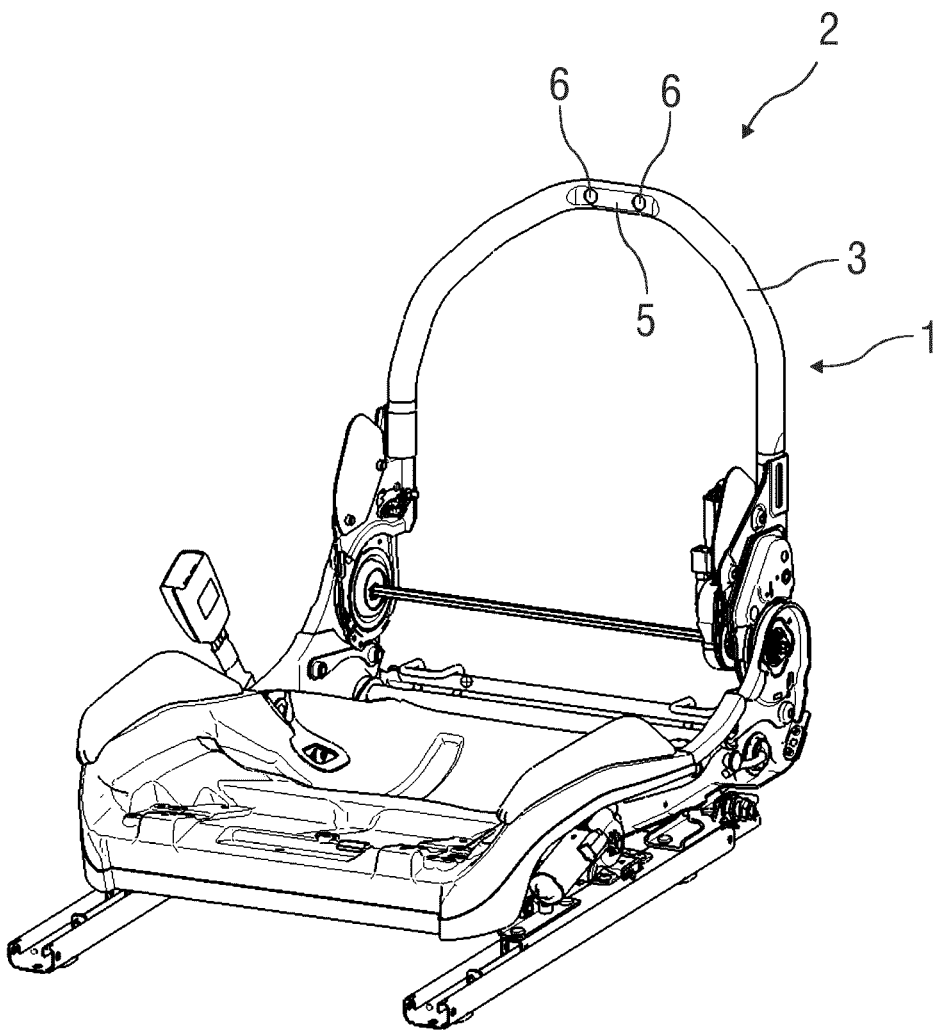
FIG. 1A schematically shows a vehicle seat.

The backrest 1 comprises an, in particular metallic, tubular frame 3 and a composite component 4 which in particular forms a backrest shell of the backrest 1. FIG. 1A shows the vehicle seat 2, with only the tubular frame 3 of the backrest 1 being illustrated here. The composite component 4 is not illustrated here.

Figure 1B:
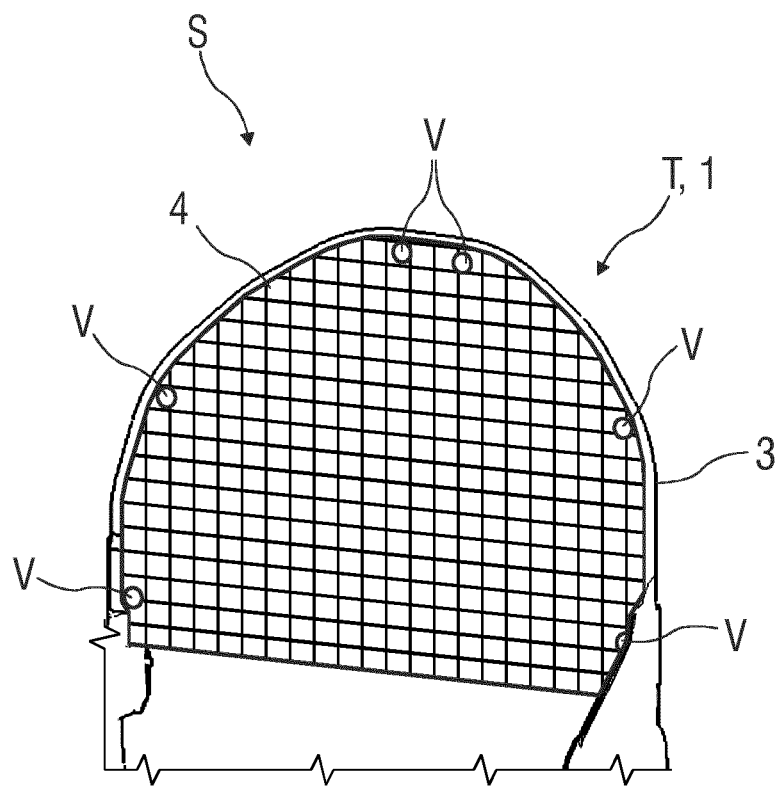
FIG. 1B schematically shows an exemplary embodiment of a support structure of a backrest, wherein the support structure comprises at least one tubular element and a composite component which are connected to one another by means of an adaptation element braced between them in an adjustable manner, FIG. 1C schematically shows an exemplary embodiment of a support structure for a backrest of a vehicle seat from the front, FIG. 1D schematically illustrates an exemplary embodiment of a support structure for a backrest of a vehicle seat from behind, FIG. 1E schematically shows an exemplary embodiment of an alternative support structure for a backrest of a vehicle seat from behind, FIG. 2 schematically shows a sectional illustration of a detail of a backrest of a vehicle seat, and FIG. 3 schematically shows a plan view of a front side of a detail of a backrest.

FIG. 1B shows an exemplary embodiment of a support structure T of the backrest 1. The support structure T comprises at least the tubular frame 3 and the composite component 4 fastened thereto. The composite component 4 is arranged on a front side of the tubular frame 3 and is connected to the tubular frame 3 by means of at least one or more screw-sleeve connections V. The one or the respective screw-sleeve connection V comprises at least one threaded sleeve 8 which is arranged in an opening 6 of the tubular frame 3. The composite component 4 is in particular fastened to the tubular frame 3 by means of a screw 10 screwed into the threaded sleeve 8.

The one or the respective screw-sleeve connection V comprises moreover an adaptation element 7 which is braced between the tubular frame 3 and the composite component 4 in an adjustable manner.

In particular, the flexible adaptation element 7 has an aperture 7.1 which can be arranged in a corresponding manner with the opening 6 in the tubular frame 3 or is arranged in the installed state. As a result, the screw 10 can be guided both through the aperture 7.1 and through the opening 6 of the tubular frame 3 in order then to fasten the composite component 4 to the tubular frame 3 in a form-fitting manner with an adjustable distance by means of the adaptation element 7. Here, with the tubular frame 3 and composite component 4 in the assembled state, the adaptation element 7 is braced between them in an adjustable manner.

As shown in FIG. 1B, the tubular frame 3 and the composite component 4 are connected to one another by means of a plurality of screw-sleeve connections V. Here, the plurality of adaptation elements 7 can be different from one another. For example, the adaptation elements 7 can differ from one another in terms of shape, size, material and/or dimensions. For example, the adaptation elements 7 can be formed with different heights in order for example to even out different heights or depths of the tubular frame 3 and/or of the composite component 4 in order that the surface side of the composite component 4 that points in the direction of the occupant has a corresponding contour. Alternatively or additionally, they can be formed with different flexibilities in order for example to correspondingly support different loading regions for example by means of stronger adaptation elements 7 than less highly loaded loading regions of the backrest 1.

Figure 1C:
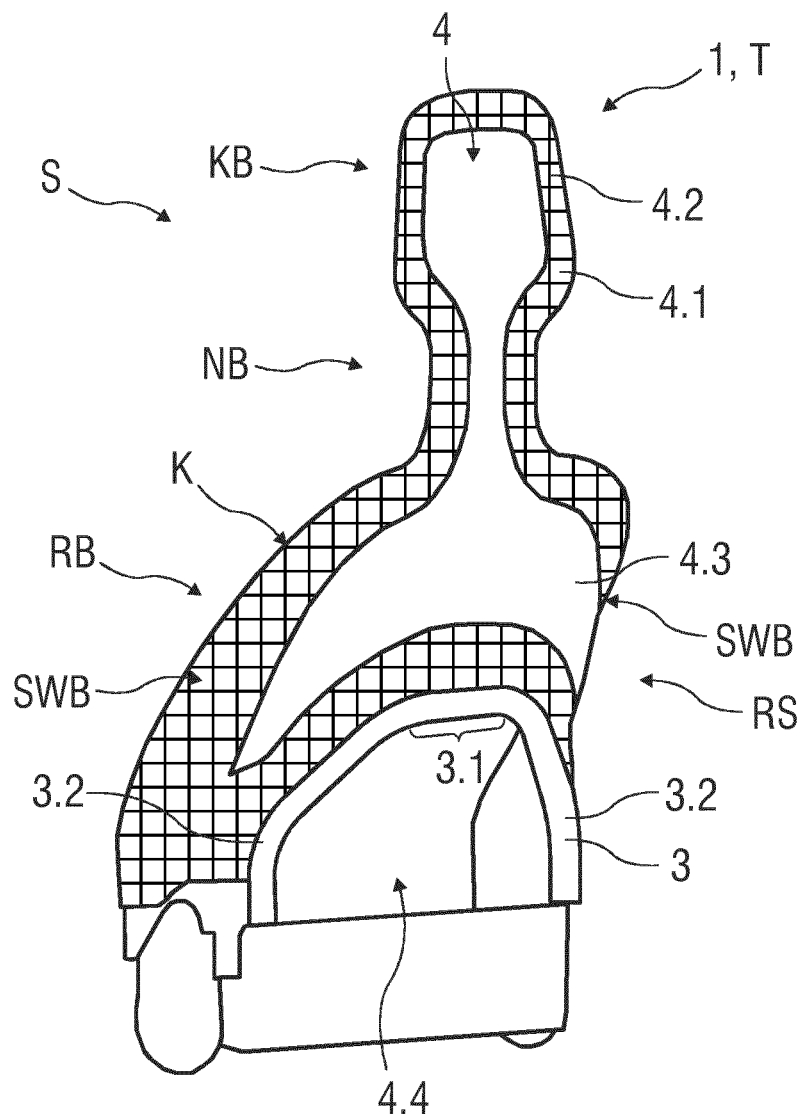

FIG. 1C schematically shows an exemplary embodiment of a front side VS of a support structure T for a seat part S of a vehicle seat that is designed as a backrest 1.

The composite component 4 and the tubular frame 3 form a contoured element K for the support structure T. Here, the contoured element K forms a seat contour for a seat user. For this purpose, both the composite component 4 and the tubular frame 3 are each shaped and joined together in such a way that they form a back contour in the present example for the backrest 1. For this purpose, the contoured element K has for example a central back region RB and two side bolster regions SWB which are inclined with respect to the back region RB.

In the exemplary embodiment, a backrest 1 with an integrated head support is shown. For this purpose, the contoured element K comprises a central back region RB which is connected to a head region KB via a neck region NB, wherein two side bolster regions SWB which are inclined with respect to the back region RB are provided in the central back region RB.

The composite component 4 is in particular of shell-shaped design and has depressions 4.1 on the front side and/or rear side that are provided with a stiffening structure 4.2, for example a ribbed and/or honeycomb structure.

Here, the composite component 4 has, in the edge region of the shell, channel-shaped depressions 4.1 which are provided with rib-shaped stiffening structures 4.2. The channel-shaped depressions 4.1 are formed for example as an edge depression which substantially completely runs around the shell of the composite component 4. In the central back region RB of the shell, the composite component 4 can have planar, in particular large-area, depressions 4.1 which are provided with a rib- or honeycomb-shaped stiffening structure 4.2. The stiffening structures 4.2 are introduced into the depressions 4.1 formed in on the front side and/or rear side in such a way that these stiffening structures 4.2 terminate flush with the shell and thus form a surface plane or contour of the seat part S and hence of the backrest 1.

In order to securely take up loads under loading, the composite component 4 has, in a lower shell region 4.3, a u-shaped cutout 4.4 in which the tubular frame 3 is arranged in a correspondingly formed manner. In particular, the tubular frame 3 extends into the side bolster region SWB and is correspondingly three-dimensionally shaped, in particular bent. For example, the tubular frame 3 comprises a central straight tube region 3.1 from which two leg tube regions 3.2 project in a substantially u-shaped manner and are shaped to correspond to the contour of the side bolster regions SWB, in particular run three-dimensionally, for example arcuately.

Figure 1D:
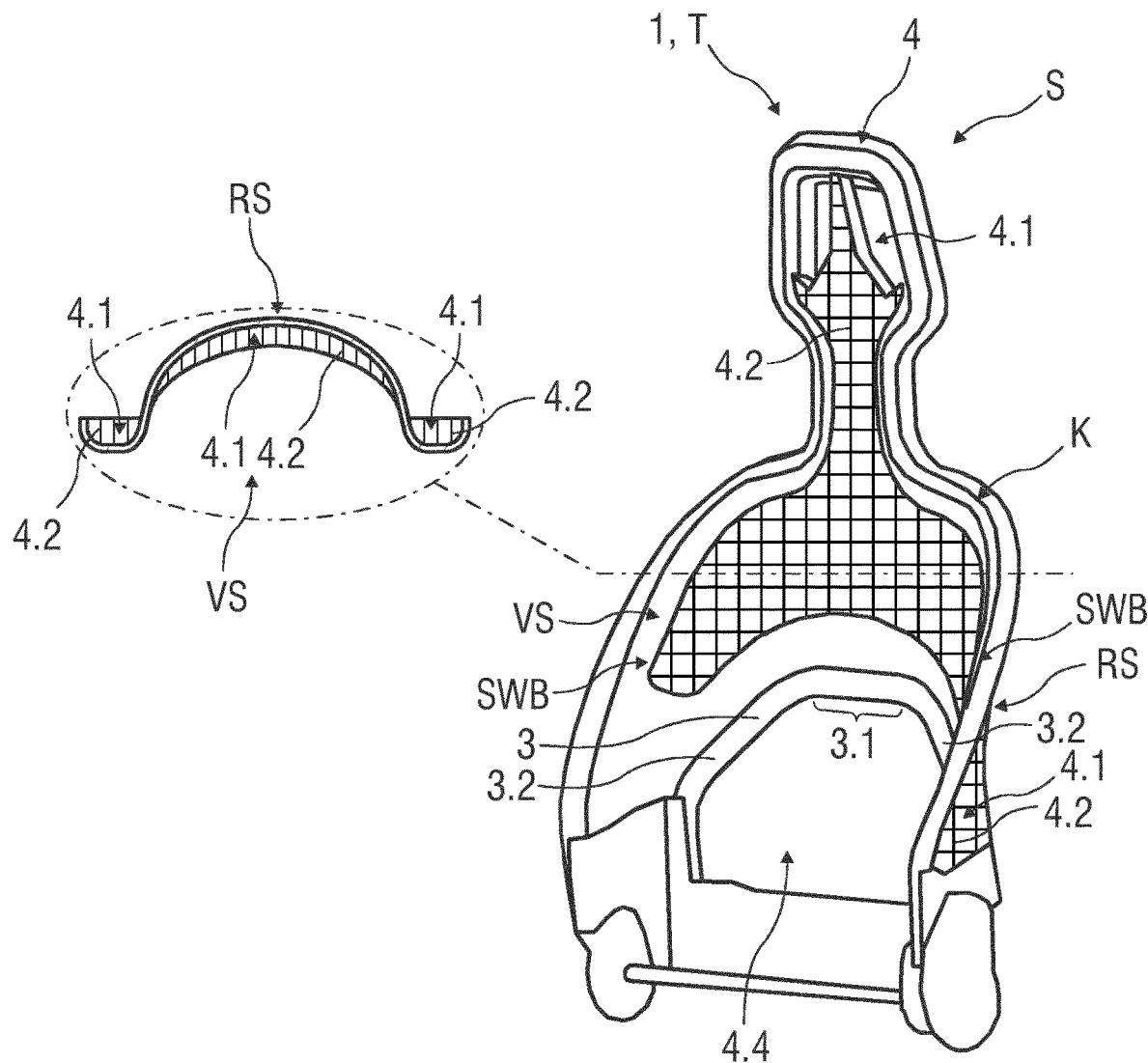

FIG. 1D schematically shows a rear side RS of the support structure T for the backrest 1 according to FIG. 1C.

Figure 1E:
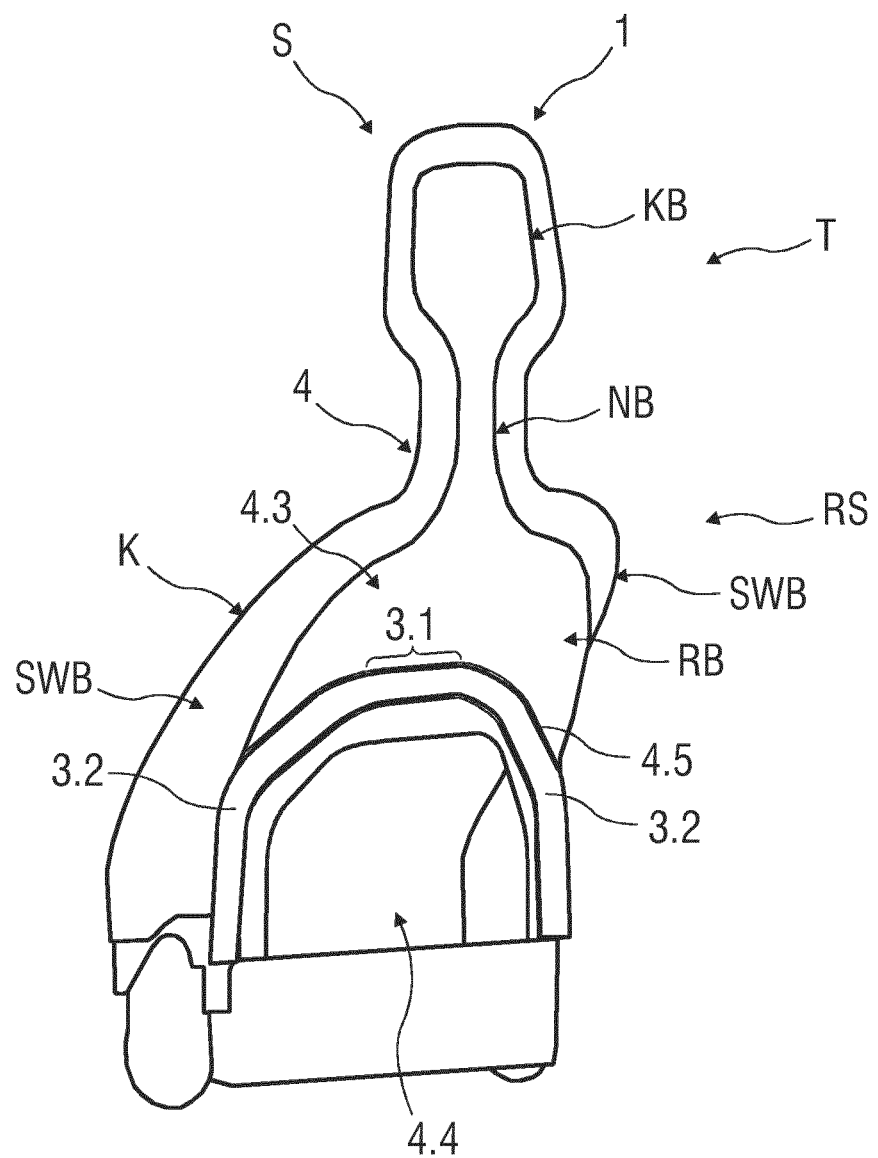

FIG. 1E schematically shows an exemplary embodiment of a rear side RS of an alternative support structure T for a backrest 1, wherein, instead of the arrangement of the tubular frame 3 in the u-shaped cutout 4.4, the tubular frame 3 is arranged in a u-shaped channel 4.5 of the composite component 4 in a correspondingly formed manner, in particular is arranged flush. In this exemplary embodiment, a rear-side stiffening structure 4.2 can be dispensed with or be formed only in edge regions (not shown in further detail). The front side VS can be formed analogously or similarly to the front side VS of the support structure T according to FIG. 1C.

Figure 2:
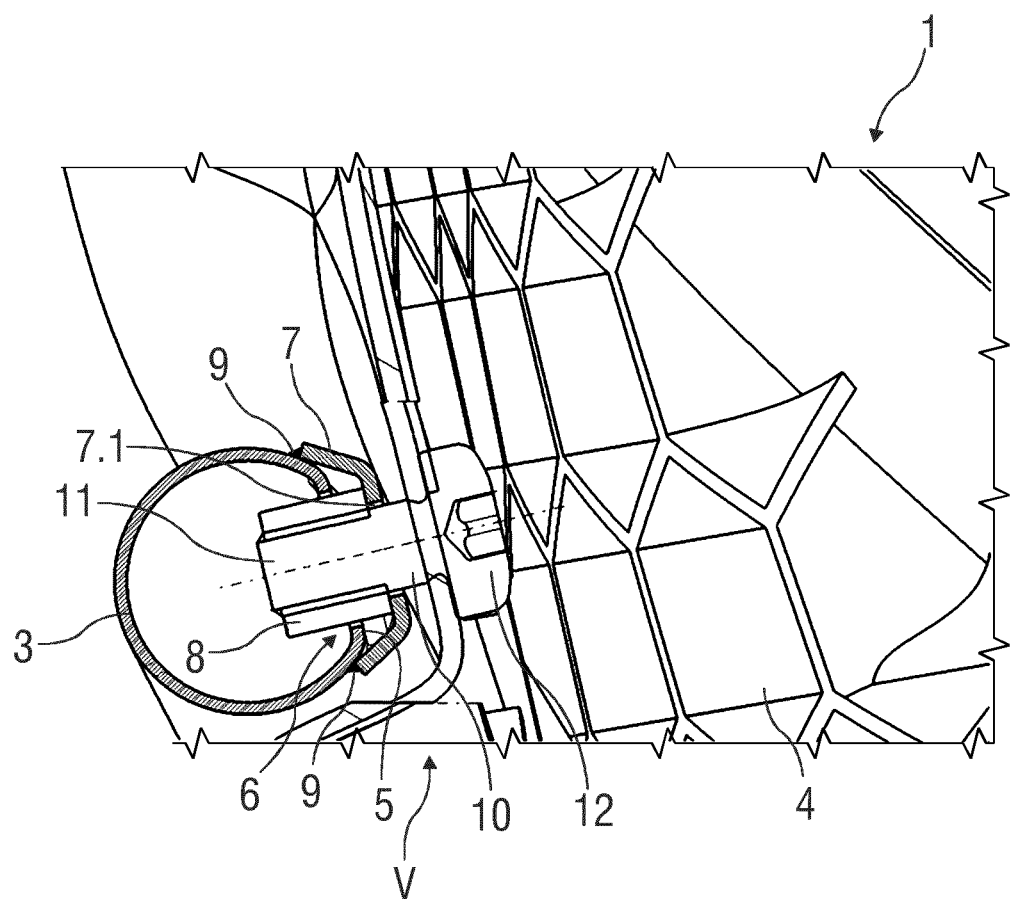
Figure 3:
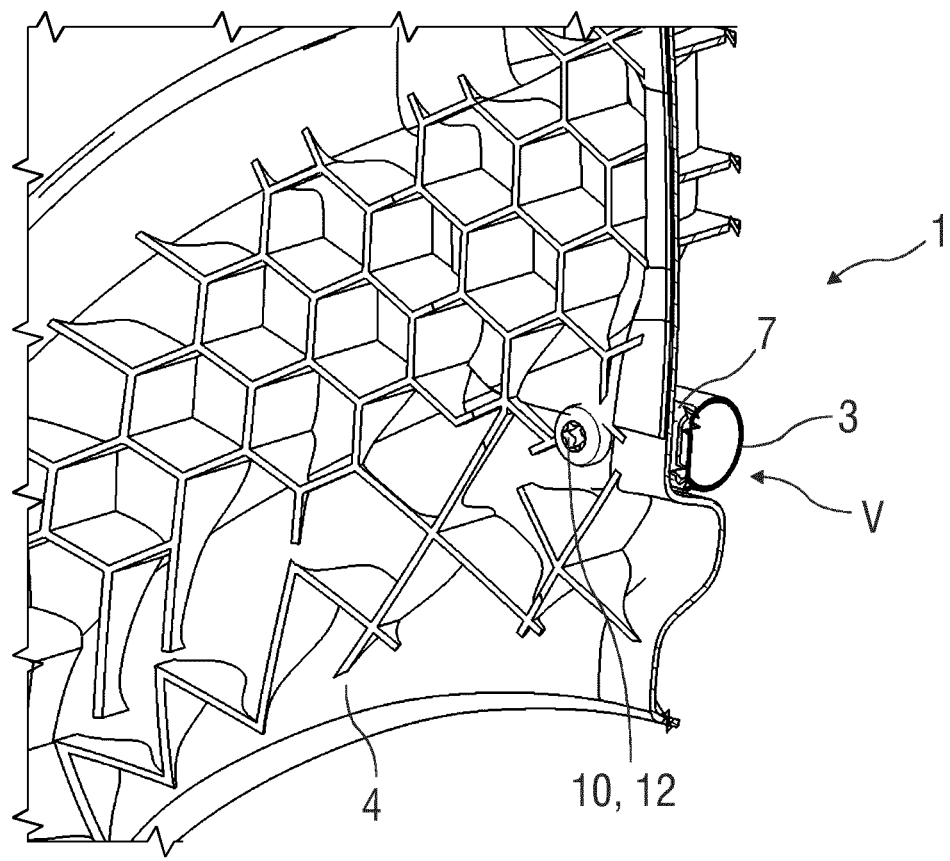

FIGS. 2 and 3 show sectional illustrations of the backrest 1.

The tubular frame 3 is formed from at least one tube, that is to say it is hollow inside or at least substantially hollow, as shown in FIGS. 2 and 3. In the illustrated example, it has a round or at least substantially round cross section, as likewise shown in FIGS. 2 and 3, in which the tubular frame 3 is sectionally illustrated.

The round cross section is particularly advantageous for reasons of strength and stiffness. However, in other exemplary embodiments, another cross-sectional shape can also be provided, for example a non-round, oval, triangular or quadrangular or polygonal or multiangular cross section.

The composite component 4 is produced for example in automated manufacture in a so-called one shot hybrid molding process as organosheet with injection-molding compound. Here, the organosheet is heated, for example by means of infrared light radiation, with the result that it can be formed. It is then placed in an injection mold and thereby formed in a predetermined manner. In addition, the injection-molding compound is molded on in the injection mold, in particular to form stiffening structures, for example in the form of rib structures and/or honeycomb structures, as can be seen in FIGS. 2 and 3. The injection-molding compound is in particular a plastic, in particular a thermoplastic.

To form the backrest 1, the composite component 4 is connected to the tubular frame 3. These two construction elements, that is to say the composite component 4 and the tubular frame 3, are load-bearing and formed in such a way, in particular designed in such a way, that they embed the body of an occupant with uniform spacing. That is to say the body advantageously has at all points an equal distance from the composite component 4 or tubular frame 3, wherein, in the finished vehicle seat 2, in particular an upholstery is arranged between the occupant and composite component 4 or tubular frame 3. In particular pressure points on the body of the occupant are avoided by this formation of the tubular frame 3 and the composite component 4.

By virtue of the high stiffness and strength of the, in particular metallic, tubular frame 3, the composite component 4 is relieved of load in dynamic load cases.

In the solution described here, a connection technique of composite component 4 and tubular frame 3 is configured in such a way that connecting elements are not visible when the load-bearing structure formed from the tubular frame 3 and composite component 4 is viewed from behind. For this purpose, the tube of the tubular frame 3 is embossed from the front, that is to say an embossment 5 is introduced into the tubular frame 3 at a front side of the tubular frame 3, and the tubular frame 3 is punched, that is to say openings 6 are introduced into the front side of the tubular frame 3 in the region of the embossment 5, in particular in the region of a base surface of the embossment 5. The front side faces a seat surface of the backrest and hence an occupant when the latter is seated in the vehicle seat 2.

An adaptation element 7, also referred to as an adaptation plate, for example with integrated threaded sleeves 8, is then fastened to the tubular frame 3 from the front in such a way that the threaded sleeves 8 each engage in an opening 6 of the tubular frame 3. For this purpose, the adaptation element 7 is fastened to the tubular frame 3 in the region of the embossment 5, in particular above the base surface of the embossment 5. Alternatively, the threaded sleeves 8 can be part of the tubular frame 3; in this case, the adaptation element 7 is placed on the opening 6 in the tubular frame 3 in such a way that the aperture 7.1 and the opening 6 lie over one another and form a through-opening for the screw.

The adaptation element 7 can be fastened to the tubular frame 3 in an integrally bonded, form-fitting and/or force-fitting manner, for example. In the example illustrated here, the fastening is effected by welding and thus in an integrally bonded manner, as can be seen in FIG. 2 from the weld seams 9. In other exemplary embodiments, the adaptation element 7 can for example also be fastened to the tubular frame 3 in some other way.

The composite component 4 is then placed on the adaptation element 7 from the front and screwed to it and thus to the tubular frame 3 from front to rear. That is to say a respective screw 10, starting from a front side of the composite component 4, is guided through the latter with a screw shank 11 and screwed into the respective threaded sleeve 8 arranged in the tubular frame 3, with the result that a respective screw head 12 is situated on the front side of the composite component 4. Since the tubular frame 3 is closed on the rear side, the connecting elements in the form of the threaded sleeves 8 and screws 10 are thus concealed by the tubular frame 3 and the composite component 4, with result that they are not visible when the backrest 1 is viewed from the rear, thereby achieving a good visual impression.

As an alternative to using the adaptation element 7 with integrated threaded sleeves 8, the threaded sleeves 8 can be directly welded into the tubular frame 3. That is to say they are then arranged in the respective opening 6 of the tubular frame 3 and welded to the tubular frame 3. However, this embodiment is in particular dependent on a tube wall thickness of the tubular frame 3 and on possible loads which act on the threaded sleeves 8 and hence on the tubular frame 3 and the welding between the threaded sleeves 8 and tubular frame 3.

The backrest 1 produced in the described manner thus comprises the, in particular metallic, tubular frame 3 and the composite component 4, wherein the tubular frame 3 has the embossment 5 on its front side and the openings 6 in the base surface of the embossment 5, into each of which openings a threaded sleeve 8 is arranged. Here, the respective threaded sleeve 8 is either directly welded into the tubular frame 3 or is a constituent part of the, in particular metallic, adaptation element 7 which is arranged on the front side of the tubular frame 3, in particular above the embossment 5, that is to say is lifted from the embossment 5 in the region thereof, and is fastened to the tubular frame 3, in particular by welding. The composite component 4 is arranged on the front side of the tubular frame 3 either directly on the tubular frame 3 or, at least in the region of the adaptation element 7, if this is present, on the front side of the adaptation element 7 and fastened to the tubular frame 3 by means of the respective screw 10 screwed into the respective threaded sleeve 8.

LIST OF REFERENCE SIGNS

1 Backrest
2 Vehicle seat
3 Tubular frame
3.1 Tube region
3.2 Leg tube region
4 Composite component
4.1 Depression
4.2 Stiffening structure
4.3 Shell region
4.4 u-shaped cutout
4.5 u-shaped channel
5 Embossment
6 Opening
7 Adaptation element
7.1 Aperture
8 Threaded sleeve
9 Weld seam
10 Screw
11 Screw shank
12 Screw head
K Contoured element
KB Head region
NB Neck region
RB Central back region
RS Rear side
S Seat part
SWB Side bolster region
T Support structure
V Screw-sleeve connection
VS Front side

What is claimed is:

1. A seat part, in particular a backrest for a vehicle seat, comprising:
a support structure which comprises at least one tubular frame and at least one composite component, wherein the at least one tubular frame has, on a front side, at least one opening in which at least one threaded sleeve is arranged, and the at least one composite component is arranged on the front side of the at least one tubular frame and is fastened to the at least one tubular frame via at least one screw screwed into the at least one threaded sleeve, wherein the at least one tubular frame has at least one embossment formed on the front side adjacent the at least one opening, wherein the at least one threaded sleeve is coupled to at least one adaption element, wherein the at least one adaption element is disposed on the front side of the at least one tubular frame adjacent a base surface of the at least one embossment, and wherein the at least one threaded sleeve is directly coupled to the at least one tubular frame.

2. The seat part as claimed in claim 1, wherein the at least one adaptation element having at least one aperture, which is arranged in correspondence with the at least one opening, for the at least one screw is provided between the at least one tubular frame and the at least one composite component, wherein the at least one screw penetrates the at least one adaptation element and, with the at least one tubular frame and the at least one composite component in an assembled state of the support structure, the at least one adaption element is braced between them in an adjustable manner.

3. The seat part as claimed in claim 1, wherein the at least one composite component and the at least one tubular frame form at least one contoured element.

4. The seat part as claimed in claim 3, wherein the at least one contoured element forms at least one seat contour for a seat user and has a central region and two side bolster regions which are inclined with respect to the central region.

5. The seat part as claimed in claim 3, wherein the at least one contoured element forms a seat contour for a backrest with integrated headrest and has a central back region, which is connected to a head region via a neck region, and two side bolster regions which are inclined with respect to the back region.

6. The seat part as claimed in claim 1, wherein the at least one composite component has a shell-shaped design and has, on at least one of the front side and a rear side, depressions which are provided with at least one stiffening structure.

7. The seat part as claimed in claim 1, wherein the at least one composite component has, in a lower shell region, one of a u-shaped cutout and a u-shaped channel in which the at least one tubular frame is arranged in a correspondingly formed manner.

8. The seat part as claimed in claim 1, wherein the at least one threaded sleeve is directly welded into the at least one tubular frame.

9. The seat part as claimed in claim 1, wherein the at least one threaded sleeve is a constituent part of the at least one adaptation element, which is fastened to the front side of the at least one tubular frame.

10. The seat part as claimed in claim 1, wherein at least a portion of at least one of the at least one adaptation element and the at least one tubular frame is formed from metal.

11. The seat part as claimed in claim 1, wherein the at least a portion of the at least one adaptation element is welded to the at least one tubular frame.

12. The seat part as claimed in claim 1, wherein the at least one composite component is configured from, including formed from, at least one organosheet.

13. The seat part as claimed in claim 12, wherein at least one injection-molding compound is molded onto the at least one organosheet.

14. The seat part as claimed in claim 1, wherein a portion of a rear side of the at least one tubular frame located directly opposite the at least one opening formed in the front side of the at least one tubular frame is closed.

15. The seat part as claimed in claim 1, wherein, in an assembled state of the support structure, the at least one threaded sleeve is concealed from a rear view by the at least one tubular frame.

16. The seat part as claimed in claim 1, wherein the screw is disposed through the at least one opening formed on the front side of the at least one tubular frame.

17. A seat part, in particular a backrest for a vehicle seat, comprising:
a support structure which comprises at least one tubular frame and at least one composite component, wherein the at least one tubular frame has, on a front side, at least one opening in which at least one threaded sleeve is arranged, wherein the at least one composite component is arranged on the front side of the at least one tubular frame and is fastened to the at least one tubular frame via at least one screw screwed into the at least one threaded sleeve, and wherein, in the assembled state of the support structure, the at least one threaded sleeve is concealed from a rear view by the at least one tubular frame.

18. The seat part as claimed in claim 17, wherein a least a portion of a rear side of the at least one tubular frame is closed to conceal the at least one threaded sleeve from the rear view.

19. The seat part as claimed in claim 17, wherein, in the assembled state of the support structure, the at least one threaded sleeve is concealed from a front view by at least one of the at least one composite component and at least one adaption element.

* * * * *